A. F. SCOW.

Basket-Formers.

No. 5,757. Reissued Feb. 10, 1874.

WITNESSES.

W. T. Newman,

Wm. H. Brenton Jr.

INVENTOR.

Anton F. Scow,

By Seggett & Seggett

Attorneys.

AM. PHOTO-LITHOGRAPHIC CO. N.Y. (OSBORNE'S PROCESS)

UNITED STATES PATENT OFFICE.

ANTON F. SCOW, OF ST. JOSEPH, MICHIGAN.

IMPROVEMENT IN BASKET-FORMERS.

Specification forming part of Letters Patent No. 138,765, dated May 13, 1873; reissue No. 5,757, dated February 10, 1874; application filed December 31, 1873.

*To all whom it may concern:*

Be it known that I, ANTON F. SCOW, of St. Joseph, county of Berrien, State of Michigan, have invented a new and Improved Basket-Former; and declare the following to be a full, clear, and complete description thereof, reference being had to the accompanying drawings.

My invention relates to an improvement in basket-forms; and consists in a hinged clamp which is combined with adjustable standards for holding the basket-bottom in position for weaving the splints, and in a band which surrounds the lower end of the form, said band being provided with a suitable number of dovetailed grooves, in which move dovetailed clamps for holding the standards in place.

Figure 1:
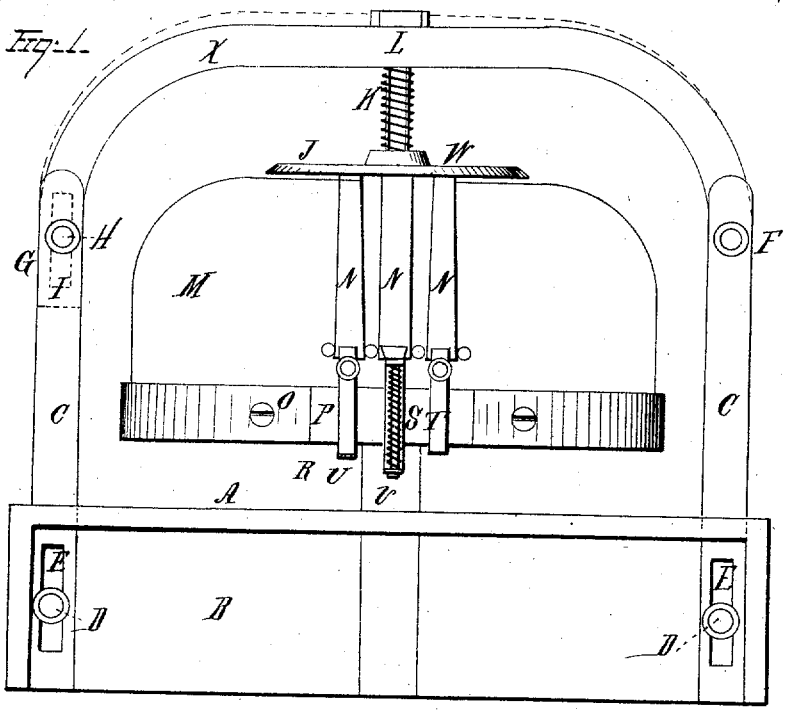
Figure 2:
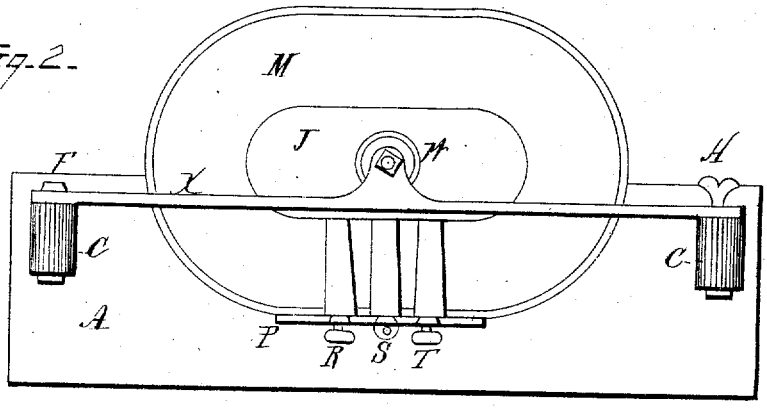
Figure 3:
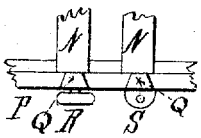

In the drawings, Figure 1 is a side elevation of my invention. Fig. 2 is a plan view of the same; and Fig. 3, details of the clamps, in which—

A B represent the foundation or frame which supports the form and my improvements, it being made of wood or any suitable material, and of any size required. C C represent adjustable standards, which slide through the frame A B, and are provided with slots E for receiving the set-screws D, which hold the standards at the required height for different-sized basket-forms. A metal clamp, X, is pivoted to one of the standards C at F, so as to swing up or down, and its other end is provided with a slot, I, as shown by dotted lines, to receive a set-screw, H, which holds the clamp to the standard, and the slot therein allowing the clamp to be adjusted to or from the form M. This form is pivoted to a standard, V, in the usual manner, so as to rotate, and the bottom J of the basket is held closely to it by a spring-clamp, K, which passes through the curved clamp X. If, however, the clamp X is made of spring-metal, the clamp K may be substituted by any suitable stationary bearing to press against the bottom J. The lower end of the form is provided with a band, O P, corresponding in thickness to the thickness of the standards of the basket, for the purpose of preventing the ends of said standards from catching the hands and clothes of the operator, and for the purpose of providing a suitable support for the catches T, which slide back and forth in a groove made transversely in said band for the purpose. The grooves in this band are dovetailed in shape, and the clamps sliding in them are correspondingly counter-shaped.

In the drawings are shown but a limited number of these catches upon the band O P, but the number provided in the working-machine corresponds to the number of basket-standards employed. By this means the making of a hole through the bottom J is avoided, while at the same time the band O P prevents the lower ends of the splints from catching the clothing or hands of the operator, and forms a convenient support for the latches which hold the splints while weaving.

To change the devices for a larger or smaller form, the set-screws D must be loosened, which will permit the standards C to be raised or lowered. The bottom is held to the form M by means of the set-screw H and clamp X, the clamp X being swung over back on pivot F when the form M has to be removed.

I am aware of a device patented jointly by J. B. Sweetland and E. C. Goodrich, December 12, 1865. I therefore do not claim, broadly, the employment of a spring-clamp for retaining the extremities of the standards; but

What I claim is—

1. The curved clamp X, with stationary or adjustable standards C, when used to hold the bottom J to the form M, substantially as set forth and shown.

2. The combination of the band O P, provided with the dovetailed grooves Q and the dovetailed sliding clamps for retaining the ends of the standards N, substantially as shown and described.

ANTON F. SCOW.

Witnesses:
WELLS W. LEGGETT,
ROBT. M. BARR.